US010628355B2

(12) United States Patent
Jalal et al.

(10) Patent No.: US 10,628,355 B2
(45) Date of Patent: Apr. 21, 2020

(54) APPARATUS AND METHOD FOR PROCESSING BURST READ TRANSACTIONS

(71) Applicant: Arm Limited, Cambridge (GB)

(72) Inventors: Jamshed Jalal, Austin, TX (US);
Tushar P Ringe, Austin, TX (US);
Anitha Kona, Austin, TX (US);
Andrew Brookfield Swaine, Sheffield (GB); Michael Andrew Campbell, Waterbeach (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/135,149

(22) Filed: Sep. 19, 2018

(65) Prior Publication Data
US 2020/0089634 A1   Mar. 19, 2020

(51) Int. Cl.
*G06F 13/364*   (2006.01)
*G06F 13/28*    (2006.01)
*G06F 13/16*    (2006.01)

(52) U.S. Cl.
CPC .......... *G06F 13/28* (2013.01); *G06F 13/1626* (2013.01); *G06F 13/1673* (2013.01);
(Continued)

(58) Field of Classification Search
None
See application file for complete search history.

(56) References Cited

U.S. PATENT DOCUMENTS

| 6,871,237 B2 * | 3/2005 | Han | G06F 13/28 |
| | | | 709/212 |
| 7,725,665 B2 * | 5/2010 | Horishima | G06F 13/28 |
| | | | 711/154 |

(Continued)

*Primary Examiner* — Elias Mamo
(74) *Attorney, Agent, or Firm* — Nixon & Vanderhye P.C.

(57) ABSTRACT

An apparatus and method are provided for processing burst read transactions. The apparatus has a master device and a slave device coupled to the master device via a connection medium. The master device comprises processing circuitry for initiating a burst read transaction that causes the master device to issue to the slave device, via the connection medium, an address transfer specifying a read address. The slave device is arranged to process the burst read transaction by causing a plurality of data items required by the burst read transaction to be obtained based on the read address specified by the address transfer, and by performing a plurality of data transfers over the connection medium in order to transfer the plurality of data items to the master device. The slave device has transfer identifier generation circuitry for generating, for each data transfer, a transfer identifier to be transmitted over the connection medium to identify which data item in the plurality of data items is being transferred by that data transfer. The master device has buffer circuitry to buffer data items received by the plurality of data transfers, and to employ the transfer identifier provided for each data transfer to cause the plurality of data items to be provided to the processing circuitry in a determined order irrespective of an order in which the data items are transferred to the master device via the plurality of data transfers. This can significantly reduce the overhead required to manage the supply of the data items to the processing circuitry in the required determined order.

19 Claims, 9 Drawing Sheets

(52) U.S. Cl.
CPC .... G06F 13/364 (2013.01); *G06F 2213/0052* (2013.01); *G06F 2213/2806* (2013.01)

(56) References Cited

U.S. PATENT DOCUMENTS

| | | | | |
|---|---|---|---|---|
| 8,332,564 | B2* | 12/2012 | Matterne | G06F 13/124 710/305 |
| 2002/0122335 | A1* | 9/2002 | Love | G11C 7/1018 365/189.15 |
| 2008/0320178 | A1* | 12/2008 | Shirasaki | G06F 13/28 710/22 |
| 2012/0290752 | A1* | 11/2012 | Lim | G06F 13/4022 710/110 |
| 2013/0054852 | A1* | 2/2013 | Fuoco | G06F 13/4022 710/110 |

\* cited by examiner

APPARATUS AND METHOD FOR PROCESSING BURST READ TRANSACTIONS

BACKGROUND

The present technique relates to an apparatus and method for processing burst read transactions.

It is known for data processing systems to support the use of burst read transactions, where a master device may initiate a single read transaction that causes multiple data items to be retrieved and returned to the master device. The individual data items may be referred to as beats of the burst transaction and hence a burst read transaction will comprise a plurality of beats. In order to perform the burst transaction, the master device will typically issue an address transfer to a slave device via a connection medium of the system. The connection medium can take a variety of forms, but could for example be an interconnect interconnecting one or more master devices with one or more slave devices.

Typically the communication between the master devices and slave devices is arranged to conform to a particular communication protocol, and when handling burst read transactions, it is often the case that the beats of the read transaction must be returned to the processing circuitry of the master device in a predetermined order. This response ordering rule on the data beats can place significant constraints on elements within the system where there may be intermediate nodes which are collecting beats from divergent sources and then sending those beats upstream towards the master device in the required order. Such intermediate nodes for example may need to add reorder buffers to ensure that the beats received can be buffered and reordered so that they can be propagated onto the master device in the required predetermined order.

Such reordering constraints can limit the extent to which burst read transactions are used. For example, in a particular implementation, the burst size may be limited to relatively small numbers of beats so as to reduce the reorder buffer requirements within the system. However, this avoids the potential performance benefits that can be realised by using larger burst transactions. Alternatively, a particular implementation may choose to serialise all read transactions, hence avoiding the use of burst transactions altogether, to thereby avoid the need for reorder buffers. However, such systems typically suffer from poor performance relative to systems that do allow the use of burst read transactions.

Accordingly, it would be desirable to provide an improved mechanism for processing burst read transactions within systems where a response ordering rule is associated with the beats of the transaction.

SUMMARY

In one example arrangement, there is provided an apparatus comprising: a master device; and a slave device coupled to the master device via a connection medium; the master device comprising processing circuitry to initiate a burst read transaction causing the master device to issue to the slave device, via the connection medium, an address transfer specifying a read address; the slave device being arranged to process the burst read transaction by causing a plurality of data items required by the burst read transaction to be obtained using the read address specified by the address transfer, and by performing a plurality of data transfers over the connection medium in order to transfer the plurality of data items to the master device; the slave device comprising transfer identifier generation circuitry to generate, for each data transfer, a transfer identifier to be transmitted over the connection medium to identify which data item in said plurality of data items is being transferred by that data transfer; and the master device comprising data buffer circuitry to buffer data items received via the plurality of data transfers, and to employ the transfer identifier provided for each data transfer to cause the plurality of data items to be provided to the processing circuitry in a determined order irrespective of an order in which the data items are transferred to the master device via the plurality of data transfers.

In another example arrangement, there is provided a master device comprising: interface circuitry to connect the master device to a connection medium to facilitate communication with a slave device; processing circuitry to initiate a burst read transaction causing the master device to issue to the slave device, via the connection medium, an address transfer specifying a read address; the interface circuitry being arranged to receive from the slave device a plurality of data transfers via the connection medium, each data transfer providing a data item amongst a plurality of data items required by the burst read transaction, for each data transfer a transfer identifier being provided by the slave device over the connection medium to identify which data item in said plurality of data items is being transferred by that data transfer; and data buffer circuitry to buffer data items received via the plurality of data transfers, and to employ the transfer identifier provided for each data transfer to cause the plurality of data items to be provided to the processing circuitry in a determined order irrespective of an order in which the data items are transferred to the master device via the plurality of data transfers.

In a yet further example arrangement, there is provided a slave device comprising: interface circuitry to connect the slave device to a connection medium to facilitate communication with a master device, the interface circuitry being arranged to receive, via the connection medium, an address transfer specifying a read address in response to a burst read transaction being initiated by processing circuitry of the master device, the slave device being arranged to process the burst read transaction by causing a plurality of data items required by the burst read transaction to be obtained using the read address specified by the address transfer, and by issuing a plurality of data transfers over the connection medium in order to transfer the plurality of data items to the master device; and transfer identifier generation circuitry to generate, for each data transfer, a transfer identifier to be transmitted over the connection medium to identify which data item in said plurality of data items is being transferred by that data transfer, thereby enabling the master device to buffer data items received via the plurality of data transfers, and to employ the transfer identifier provided for each data transfer to cause the plurality of data items to be provided to the processing circuitry in a determined order irrespective of an order in which the data items are transferred to the master device via the plurality of data transfers.

In a still further example arrangement, there is provided a method of processing burst read transactions, comprising: employing processing circuitry of a master device to initiate a burst read transaction to cause the master device to issue to a slave device, via a connection medium, an address transfer specifying a read address; processing the burst read transaction at the slave device by causing a plurality of data items required by the burst read transaction to be obtained using the read address specified by the address transfer, and by performing a plurality of data transfers over the connection medium in order to transfer the plurality of data items to the master device; generating at the slave device, for each data transfer, a transfer identifier to be transmitted over the connection medium to identify which data item in said plurality of data items is being transferred by that data transfer; and buffering at the master device data items received via the plurality of data transfers, and employing the transfer identifier provided for each data transfer to cause the plurality of data items to be provided to the processing circuitry in a determined order irrespective of an order in which the data items are transferred to the master device via the plurality of data transfers.

In an additional example arrangement, there is provided an apparatus comprising: master means; and slave means for coupling to the master means via a connection medium; the master means comprising processing means for initiating a burst read transaction causing the master means to issue to the slave means, via the connection medium, an address transfer specifying a read address; the slave means for processing the burst read transaction by causing a plurality of data items required by the burst read transaction to be obtained using the read address specified by the address transfer, and by performing a plurality of data transfers over the connection medium in order to transfer the plurality of data items to the master means; the slave means comprising transfer identifier generation means for generating, for each data transfer, a transfer identifier to be transmitted over the connection medium to identify which data item in said plurality of data items is being transferred by that data transfer; and the master means comprising data buffer means for buffering data items received via the plurality of data transfers, and for employing the transfer identifier provided for each data transfer to cause the plurality of data items to be provided to the processing means in a determined order irrespective of an order in which the data items are transferred to the master means via the plurality of data transfers.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
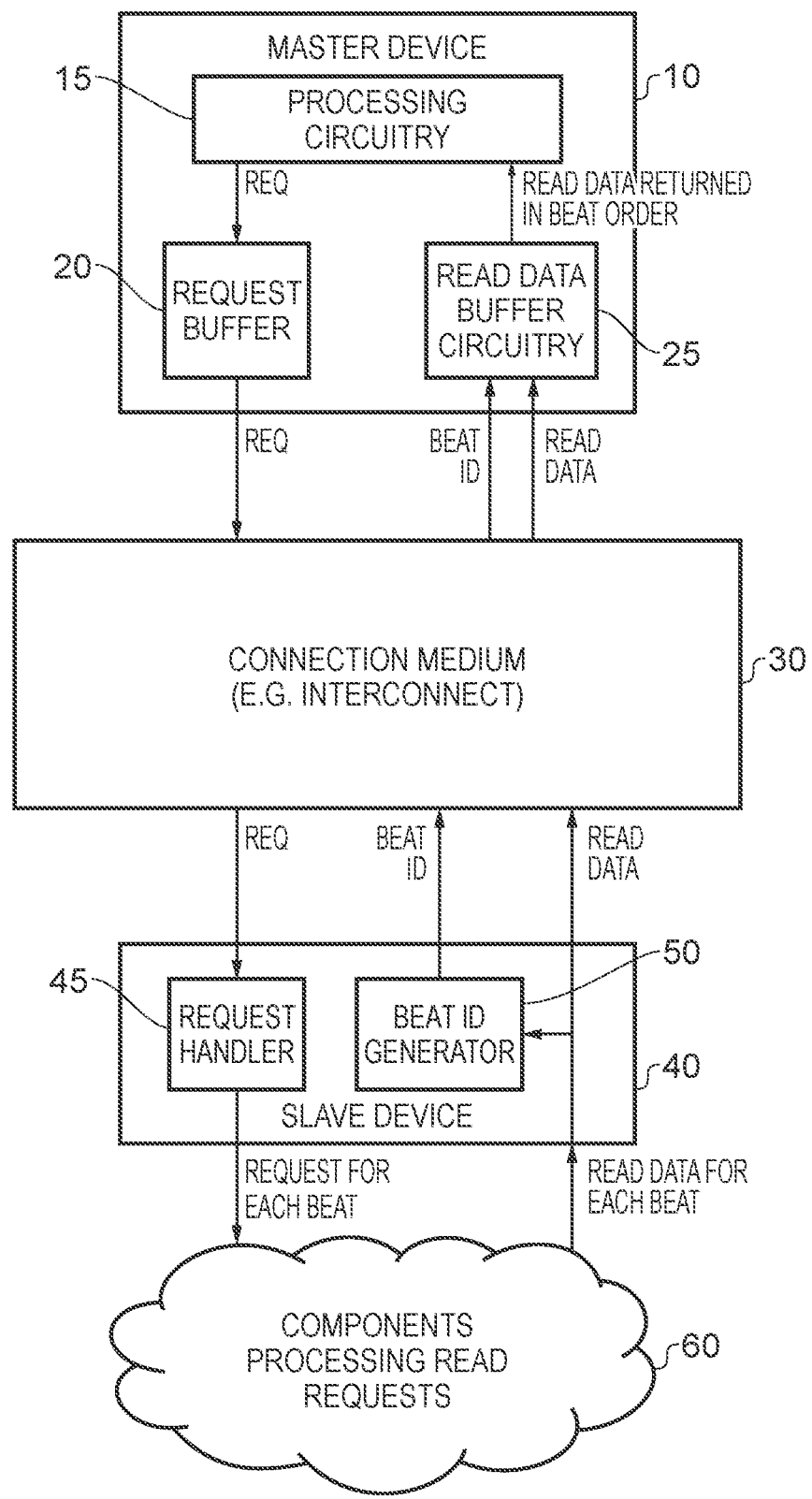
FIG. 1 is a block diagram of a system in accordance with a first example arrangement.

As discussed earlier, when the protocol used for controlling transfers performed between a master device and a slave device within a data processing system require that the various beats of a burst read transaction are returned to the processing circuitry of the master device in a predetermined order, that ordering constraint can give rise to significant area overhead within the design of the system. In particular, at any intermediate node where beats are being collected from divergent sources prior to onward propagation towards the master device, it will typically be necessary to provide reorder buffers to allow the various beats received by that intermediate node to be reordered prior to onward propagation towards the master device. In some implementations, it may be decided to limit the size of burst read transactions so as to reduce the amount of reorder buffer circuitry required within the system. However, such an approach reduces the potential performance benefit that can be realised by using larger burst read transactions. For example, it may be that a burst read transaction could identify a significant number of read data items that all need to be read from the same page in memory, and if a single burst read transaction is issued, then it may be the case that only a single lookup is required within the system memory management unit (MMU) in order to obtain the relevant address translation information required to generate physical addresses for each of those read data items to be obtained when processing the burst read transaction. However, if instead the maximum size of the burst is reduced, it would be necessary to issue multiple smaller burst read transactions, increasing the number of system MMU lookups required. Further, the use of a larger burst read transaction can reduce the header overhead within the various communications between the master and the slave device, since there is a smaller header overhead if more data is requested via a single transaction.

In some situations, the potential reorder buffer overhead to deal with burst read transactions may be considered unacceptable, and instead it may be required that all read transactions are serialised so as to avoid the need for reorder buffers. However, this can have a significant impact on performance. The inventors realised that it is often the case that the master device has some buffering storage that can be used to locally buffer received data items prior to onward provision to the processing circuitry of the master device, and in systems where that is the case the technique described herein can alleviate the above-mentioned reorder buffer requirements at intermediate nodes within the system.

In particular, in one example configuration an apparatus is provided that has a master device and a slave device coupled to the master device via a connection medium. The master device has processing circuitry for initiating a burst read transaction that causes the master device to issue to the slave device, via the connection medium, an address transfer specifying a read address.

The slave device is arranged to process the burst read transaction by causing a plurality of data items required by the burst read transaction (also referred to herein as a plurality of beats) to be obtained using the read address specified by the address transfer, and by performing a plurality of data transfers over the connection medium in order to transfer the plurality of data items to the master device. It will be appreciated that there are a number of ways in which the address for each data item (beat) can be determined from the read address specified by the address transfer, but typically burst type information will be specified for the burst read transaction, and that burst type information will be used in combination with the read address to determine the address for each data item.

In accordance with the techniques described herein, the slave device also comprises transfer identifier generation circuitry to generate, for each data transfer, a transfer identifier to be transmitted over the connection medium to identify which data item in the plurality of data items is being transferred by that data transfer. Further, the master device comprises data buffer circuitry to buffer data items received via the plurality of data transfers, and to employ the transfer identifier provided for each data transfer so as to cause the plurality of data items to be provided to the processing circuitry in a determined order irrespective of an order in which the data items are transferred to the master device via the plurality of data transfers.

Hence, through use of the transfer identifier mechanism, the individual data items associated with the burst read transaction can be returned to the master device in any order, with the provision of the transfer identifier in association with each data transfer providing the master device with sufficient information to enable it to locally reorder the data items so that they can be provided to the processing circuitry in the required order. Such an approach can significantly reduce the reorder buffer requirements of components within the system, by enabling the reordering requirement to be met locally by the master device. In particular, since the master device is provided with a transfer identifier for each data item, and has data buffer circuitry to enable it to locally buffer the received data items, the master device can take steps to ensure that the data items are ordered appropriately prior to their provision to the processing circuitry.

The data buffer circuitry can be arranged in a variety of ways but in one example comprises a buffer storage having a plurality of entries to store data items, and access control circuitry arranged, for each data transfer, to employ the transfer identifier provided for that data transfer to determine into which entry the associated data item is stored. Hence, in such an arrangement, the transfer identifier information is used when determining into which entry of the buffer storage a received data item is buffered. This enables the required ordering to be implemented by virtue of the decision as to which entry within the buffer storage each data item is stored in. The data items can then subsequently be retrieved from the buffer storage by reading the data items stored in a particular sequence of entries such that when those sequence of entries are read in a particular order this will ensure that the data items are returned to the processing circuitry in the determined order required by the ordering constraints of the system.

In one example implementation, each transaction initiated by the processing circuitry has a transaction identifier which is provided in association with each transfer performed over the connection medium, and for each data transfer the access control circuitry is arranged to use the transaction identifier and the transfer identifier provided for that data transfer to determine into which entry the associated data item is stored. Hence, in such an arrangement the combination of the transaction identifier and the transfer identifier can be used to directly identify the particular entry into which a received data item is stored. This can significantly reduce the complexity of the access control circuitry used to access the entries of the buffer storage. In particular, there is no need to maintain a write pointer for each pending transaction, nor is there a requirement to update any such write pointer as each beat of read data is received. Instead, write pointers do not need to be maintained, since the entry can be identified directly based on a combination of the transaction identifier and the transfer identifier. In one example implementation, the transaction identifier can act as a base pointer to a series of entries into which the data items of a transaction can be stored, and the transfer identifier can be used as an offset from that base pointer to identify the particular entry.

As mentioned earlier, by such an approach, the ordering constraint can be met by the determination made as to which entry in the buffer storage is to store each received data item. In particular, once the above described mechanism has been used to determine the entry into which each data item is stored, the required determined order for the various beats of the transaction will be met when the relevant entries in the buffer storage are then accessed in a predetermined sequence during a read operation. In particular, the read operation will then cause the plurality of data items of the read transaction to be provided to the processing circuitry in the determined order without any additional steps needing to be taken.

In one example arrangement, the slave device is arranged to provide, in association with a final data transfer issued over the connection medium for the burst read transaction, a last transfer identifier. It should be noted that, due to the mechanism described earlier, there is no need for the final data transfer to include the data item needed by the last of the sequence of beats when the beats are considered in the determined order, since the use of the transfer identifier allows the slave device to provide the data items in any order. However, the slave device will still know when it is issuing the final data transfer (for example if there are 8 beats in the read transaction, it will know when the $8^{th}$ data item is being returned), and hence can include the last transfer identifier in association with that final data transfer. From the above discussion, it will be appreciated that that final data transfer may include any of the beats (i.e. any of beats 1 to 8 in the above example of a transaction identifying 8 beats).

In one example arrangement, the data buffer circuitry may be responsive to the last transfer identifier to allow a read operation to be performed once the data item of the final data transfer has been buffered, the read operation causing the plurality of entries storing the plurality of data items to be read in order to provide the plurality of data items to the processing circuitry in the determined order. Hence, in accordance with such an approach, the data buffer circuitry can be used to locally buffer all of the beats of the read data transaction, and then once the last transfer has been identified, to allow the read operation to be performed so that the plurality of data items are then provided to the processing circuitry in the determined order. This provides a particularly simple and effective mechanism for processing the multiple data items of the burst read transaction, by avoiding the need for the master device to perform any ongoing analysis of the buffer contents in order to decide when to allow those contents to be forwarded onto the processing circuitry.

However, if desired, analysis circuitry could be provided to analyse the contents of the relevant entries within the data buffer circuitry, so as to allow individual data items to be forwarded to the processing circuitry before all of the beats of the transaction have been completed. For example, if at a certain point in time it is known that beats 1, 2, 3, 7 and 8 are present within the data buffer, but beats 4, 5, and 6 are not, the master device may be arranged to output beats 1, 2 and 3 back to the processing circuitry whilst waiting for the remaining beats. However, beats 7 and 8 will not be output from the buffer until beats 4, 5 and 6 have been stored into the buffer, and hence it can be ensured that the beats are provided back to the processing circuitry in the required order.

The transfer identifier can be propagated to the master device in a variety of ways. In one example implementation, the burst read transaction has a burst length indication comprising n bits and used to encode the number of data items required by the burst read transaction, and the transfer identifier is formed by an n-bit signal. Hence, a signal can be used for the transfer identifier that is the same width as the signal used to convey the burst length of the burst read transaction, such an approach allowing for all of the individual beats to be individually identified within the transfer identifier signal.

In systems where it is desired to provide backwards compatibility, for example where one or more master devices may support the use of transfer identifiers whilst one or more other master devices may not, the master device may be arranged to issue, in association with the address transfer for the burst read transaction, a transfer identifier enable signal which is set to identify that the master device supports the use of transfer identifiers. Hence, in such situations, if a master device does not support use of transfer identifiers, or for some reason a master device that does chooses not to employ that technique for a particular burst read transaction, then the transfer enable signal can be cleared to identify to the slave device that transfer identifiers should not be used for the current burst read transaction.

In one example implementation, when the transfer identifier enable signal is clear, the slave device is arranged to disable the transfer identifier generation circuitry and to arrange the plurality of data transfers such that the plurality of data items are returned over the connection medium to the master device in the determined order. This may then require the provision of reorder buffer components at one or more intermediate nodes within the system, for example at the slave device in situations where the slave device may dispatch the transfer requests for each data beat to more than one source. However, performance benefits can still be realised, since it may be possible to reduce the size of such reorder buffer circuitry required, by limiting the maximum size of burst read transactions in situations where the transfer identifier enable signal is cleared, whilst allowing larger burst read transactions to be performed when the transfer identifier enable signal is set. As another alternative in situations where the transfer identifier enable signal is clear, a slave device may be arranged to provide no buffering, and when accepting the burst that slave device will then serialise the processing so as to process one beat at a time.

In one example implementation, the slave device may be arranged to issue, in association with the data transfers for the burst read transaction, a transfer identifier valid signal which is set to identify that a transfer identifier signal associated with each data transfer provides a valid transfer identifier. This provides some flexibility as to whether the slave device employs the transfer identifier technique or not. It will be appreciated that in the earlier example where the transfer identifier enable signal is used, then if the transfer identifier enable signal is clear, the slave device will also clear the transfer identifier valid signal, since it will need to ensure that the various data items of the burst read transaction are returned in the required order.

However, even in situations where the identifier enable signal is set, the slave device could decide in certain situations to clear the transfer identifier valid signal, and to take on responsibility for returning the data beats to the master device in the required order.

In one example implementation, when the transfer identifier valid signal is clear, the master device is arranged to ignore the transfer identifier signal associated with each data transfer and instead to assume that the plurality of data items received via the plurality of data transfers are in the determined order.

The determined order in which the plurality of data items are provided to the processing circuitry can be specified in a variety of ways. In one example implementation, the burst read transaction has a default ordering associated therewith indicating an order in which the data items are expected by the processing circuitry, and the determined order ensures that the data items are provided to the processing circuitry so as to conform to the default ordering.

The default ordering associated with the burst read transaction can be determined in a variety of ways. However, in one example implementation, each data item has an associated address that is derived with reference to burst type information and the read address specified by the data transfer, and the default ordering corresponds to an order in which the addresses are derived for the plurality of data items.

Whilst the processing circuitry may be arranged so that it only supports one burst read transaction being active at any point in time, in an alternative arrangement the processing circuitry may be arranged to have up to M burst read transactions active at any point in time, and the number of entries in the buffer storage is sufficient to allow the plurality of data items of each of those M burst read transactions to be buffered. Hence, if the buffer storage can be sized appropriately to allow multiple burst read transactions to be pending at the same time, this can enable a significant performance improvement by allowing multiple burst read transactions to be in progress, and by alleviating the requirement for the slave device, or any other appropriate intermediate nodes, to perform any local reordering of the beats of the individual transactions. Instead, the transfer identifiers can be generated in the manner discussed earlier and passed back with each data transfer to the master device, each data transfer also identifying the read transaction to which that data transfer relates. Using the earlier described mechanisms, the transaction identifiers and transfer identifiers can be used to identify which entry each received data item is stored in within the buffer circuitry, so that in due course the beats of each burst read transaction can then be returned directly from the buffer circuitry to the processing circuitry in the required order.

The connection medium can take a variety of forms, but in one example implementation comprises interconnect circuitry, which is arranged to interconnect one or more master components with one or more slave components, the earlier-discussed master device forming one of the master components and the earlier-discussed slave device forming one of the slave components.

Particular examples will now be described with reference to the Figures.

FIG. 1 is a block diagram of a system in accordance with one example arrangement. A master device 10 has processing circuitry 15 for performing data processing operations. During the performance of those data processing operations, the processing circuitry may need to obtain read data from one or more components external to the master device, and may also generate write data to be output to one or more external components for storage therein. To handle such read and write requirements, the master device can initiate transactions within the system of FIG. 1, causing a number of transfers to take place between the master device and one or more slave devices in either direction. In particular, the master device can output a request (also referred to herein as an address transfer) specifying an address associated with the transaction, and can also output in association with that address transfer various items of control information to identify the type of transaction, for example whether the transaction is a read transaction or a write transaction. That request is then forwarded via the connection medium 30 to the appropriate slave device 40 for processing. In association with the address transfer, data transfers can also then take place between the master device and the slave device during the performance of the transaction. In the case of a write transaction, this may involve one or more write data transfers being propagated from the master device to the slave device identifying the write data items, whereas for a read transaction this may involve one or more data transfers being issued from the slave device back to the master device providing the required read data items.

For the purposes of the following discussion, the performance of read transactions will be considered, and in particular a technique will be described for efficiently handling burst read transactions issued by the master device 10. In accordance with a burst read transaction, the master device issues a single address transfer as a request to the slave device 40, that address transfer specifying a read address. In addition the control information provided as part of the address transfer identifies that the transaction is a read transaction and that it is a burst transaction. The control information will also typically identify the length of the burst, the length identifying the number of data items that are required by the burst read transaction, and may also specify other information such as the size of each data item.

A request buffer 20 can be provided within the master device 10 to buffer address transfers issued by the processing circuitry before they are dispatched to the target slave device via the connection medium.

When a request is dispatched to the slave device 40, the slave device receives the request at the request handler 45, and analyses the request in order to determine the address of each data item required. There are a number of ways in which the address of each data item can be derived from the read address specified by the address transfer. However, typically an indication of the transaction type will be used in this process. Purely by way of example, a situation will be considered where the Advanced eXtensible Interface (AXI) protocol developed by Arm Limited, Cambridge, UK is used to control the transfers performed between the master device and the slave device within the system of FIG. 1. In accordance within the AXI protocol, a number of different burst types are supported, which are identified as "fixed", "incr" (i.e. incrementing) or "wrap". In a fixed burst, the address remains the same for every transfer in the burst, and such a burst type can be used for repeated accesses to the same location, such as when loading or emptying a peripheral FIFO. In an incrementing burst, the address for each transfer in the burst is an increment of the previous transfer address and the increment value depends on the size of the transfer. For example, the next address for a data transfer in a burst with a size of 4 bytes is the previous address plus four. A wrapping burst is similar to an incrementing burst in that the address for each transfer in the burst is an increment of the previous transfer address. However, in a wrapping burst the address wraps round to a lower address when a wrap boundary is reached. The wrap boundary may be set to be the size of each transfer in the burst multiplied by the total number of transfers in the burst. Such a type of burst may be useful when accessing a cache line, for example.

Once the request handler 45 has identified the individual addresses required for the data items to be retrieved when processing the burst read transaction, it can issue individual requests for each data item to one or more components 60 that are used for processing those read requests. It will be appreciated that, depending on the nature of the components 60, not all of the address transfers will be issued to the same component, and accordingly it is possible that the read data obtained from those components can be returned to the slave device 40 in a different order to that in which the requests were output from the request handler 45. The individual data items, and the associated data transfers for those data items, are referred to herein as "beats", and it will be appreciated that for a burst read transaction there will be a plurality of beats, each beat providing one of the required data items for the transaction. In accordance with some transaction protocols, there may be a requirement that the individual beats of a burst read transaction are returned to the processing circuitry 15 of the master device 10 in a predetermined order. For example, that predetermined order may correspond to the order in which the individual addresses are computed by the request handler 45 from the address transfer information provided from the master device.

Typically, this has meant that in systems that support burst read transactions, there is a requirement for one or more intermediate nodes that will be collecting the beats for a particular transaction from divergent sources to provide some local reorder buffering circuitry, so that as those beats are received by the intermediate node, they can be locally reordered so as to allow those beats to then be sent upstream towards the master device in the required order. Hence, for example, considering the implementation of FIG. 1, in situations where the requests issued by the request handler 45 for each beat of a transaction may be handled by different components, or any particular component is not constrained to provide the associated read data in the same order as the requests it receives, then the slave device 40 would typically need to provide some internal reorder buffer circuitry to enable the beats to be gathered locally within the slave device, and then reordered prior to onward propagation towards the master device 10.

However, such a requirement can incur significant area overhead in the design of the system, along with associated increased cost, which in some instances has restricted the extent to which burst read transactions have been used. However, in accordance with the techniques described herein, a mechanism is provided that alleviates the requirement for the slave device to locally reorder the data transfers (i.e. the individual beats) of a burst read transaction, and instead enables that reordering to be performed back at the master device 10.

In particular, as shown in FIG. 1 the slave device 40 is arranged to provide transfer identifier generation circuitry 50 (also referred to herein as beat ID generation circuitry) that is arranged to generate, for each data transfer (i.e. for each beat), a transfer identifier (also referred to herein as a beat identifier) to be transmitted over the connection medium 30 in association with the data item of the beat, so that that beat ID is provided with the read data to the master device 10.

The master device 10 has read data buffer circuitry 25 in which it can locally buffer data items received from the connection medium 30. The read data can then be returned to the processing circuitry 15 from the read data buffer circuitry 25. As will be discussed in more detail herein, the read data buffer circuitry includes not only buffer storage, but also associated access control circuitry which determines which entry within the buffer storage is used to accommodate each received data item. In particular, the beat ID information can be used when determining the particular entry within the buffer to receive the associated item of read data. By such an approach, it is possible to locally reorder the data items of a burst read transaction as they are received by the master device, so that when they are subsequently read from the buffer of the read data buffer circuitry 25 the individual read data items of the burst read transaction can be returned to the processing circuitry 15 in the required order. Herein, that required order will be referred to as beat order, meaning that the individual beats are returned to the processing circuitry in the order that the read requests for those beats are generated based on the address transfer information output by the master device from the request buffer 20 to initiate the burst read transaction.

Figure 2:
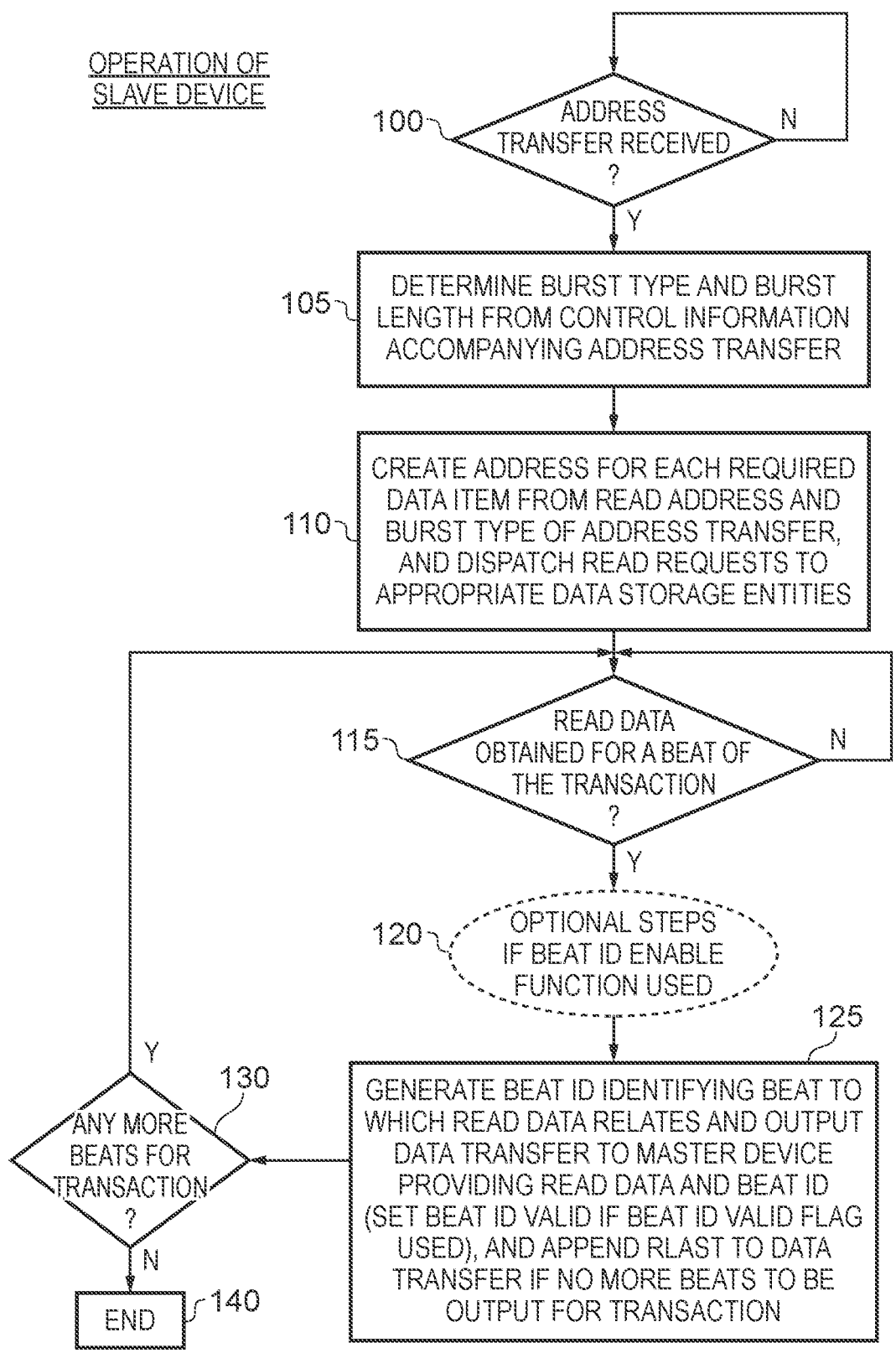
FIG. 2 is a flow diagram illustrating the operation of the slave device of FIG. 1 in accordance with one example.

FIG. 2 is a flow diagram illustrating the operation of the slave device 40 of FIG. 1 in one example implementation. At step 100, the request handler 45 awaits receipt of an address transfer from the master device 10 specifying a burst read transaction.

Once received, then the burst type and burst length information are determined from the control information accompanying the address transfer. In some implementations, additional information may also be determined at this point, such as the size of each data item.

From the information determined at step 105, the request handler then creates at step 110 an address for each required data item, and dispatches individual read requests for those data items to the appropriate components 60.

As discussed earlier, due to the way in which those various components are arranged, the individual items of read data may be returned to the slave device 40 in a different order to the order in which the requests were issued. However, the control information provided in association with each item of read data will enable the slave device to identify which beat an individual item of read data relates to. At step 115, the slave device awaits receipt of an item of read data for one of the beats of the transaction. When such an item of read data is received, then in one example implementation the process proceeds to step 125. As will be discussed later with reference to FIG. 3, a number of optional additional steps could be performed prior to that point, as indicated by the dotted step 120 in FIG. 2.

At step 125, a beat ID is generated by the beat ID generator 50 to identify the beat to which the item of read data relates, and then a data transfer is issued from the slave device 40 to the master device 10 via the connection medium 30, that provides not only the item of read data and any associated items of control information required by the transaction protocol, but also provides the beat ID information generated by the beat ID generator. As will be discussed later, in some implementations a beat ID valid signal may also be used to identify whether the beat ID signal is valid or not, and in implementations using such a beat ID valid signal, that beat ID valid signal can be set in association with the data transfer issued at step 125.

As also indicated by box 125, if the currently generated data transfer is the last data transfer of the transaction, then a separate signal can be issued to indicate that fact, referred to herein as an RLAST signal.

From the above discussion, it will be appreciated that the slave device does not need to locally buffer any of the received read data items to allow a local reordering of those data items within the slave device, and instead those data items can be output as data transfers back to the master device in the same order as they are received by the slave device, but with associated beat ID information being provided with each data transfer so as to enable the master device to identify which data item in the plurality of data items required by the burst read transaction is being provided by any particular data transfer. Since the read data is not reordered at the slave device, it will be appreciated that the last data transfer may not actually contain the final data item in the series of data items required by the burst read transaction, since that final data item may have been provided earlier. Purely by way of example, if a burst read transaction specifies 8 data items, it could for example be data item 3 that is included in the final data transfer, and in that instance the RLAST signal would be included in association with the data transfer providing data item 3, rather than being provided in association with an earlier data transfer that has provided data item 8.

In one example implementation, the RLAST signal is a pre-existing signal already provided by the transaction protocol to identify the final data transfer in a transaction, and the difference in the use case explained with reference to FIG. 2 is that the RLAST signal will not necessarily be associated with the last beat within a sequence of beats specified by the burst read transaction, but instead will merely be associated with the final beat to be issued from the slave device for the burst read transaction, irrespective of which actual beat of the transaction that data transfer relates to.

Following step 125, it is determined at step 130 whether there are any more beats awaited for the transaction, and if so the process returns to step 115. Once all the beats of the transaction have been output from the slave device, then the process ends at step 140.

In one example implementation, the original request issued by the master device for a burst read transaction may include a beat ID enable signal identifying whether that master device is enabled to process beat IDs. This can for example enable backwards compatibility with existing master devices that do not have functionality to support the use of beat IDs, or alternatively in some instances the master device may be arranged to disable the use of beat IDs for particular burst read transactions.

Further, the signals issued for each data transfer from the slave device may include a beat ID valid signal to identify whether the beat ID information is valid or not. If the beat ID is not valid, then the master device will ignore the beat ID information, and instead will assume that the individual data transfers sent by the slave device are already in beat order. If the beat ID enable signal is cleared, then the slave device will in that instance also clear the beat ID valid signal since beat IDs will not be used. If the beat ID enable signal is set then the slave device can determine whether to set the beat ID valid signal to indicate that the beat ID mechanism is being used, or to clear the beat ID valid signal to indicate that for the particular transaction the beat ID mechanism is not being used.

Figure 3:
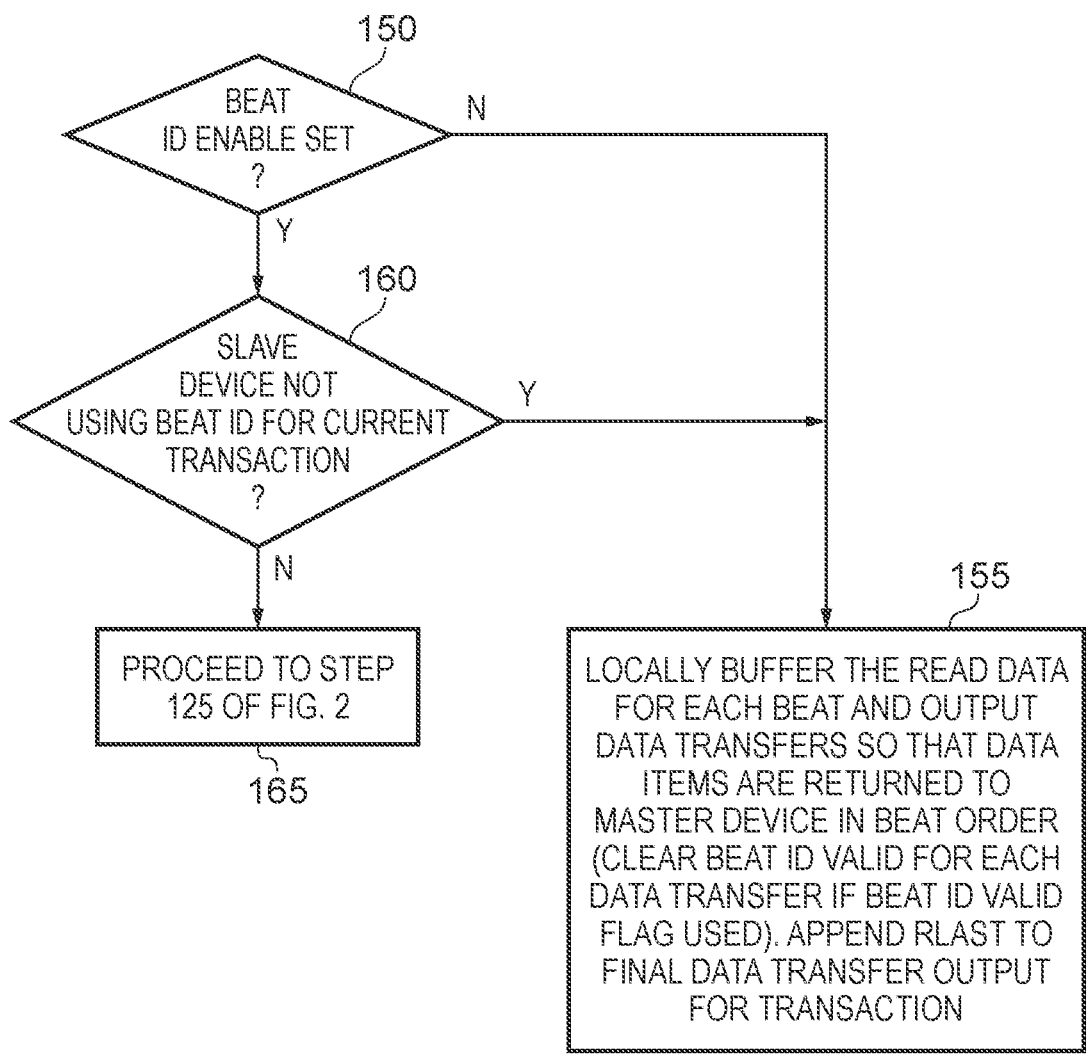
FIG. 3 is a flow diagram illustrating some optional additional steps that may be incorporated in the process of FIG. 2 in one example implementation.

FIG. 3 illustrates some additional steps that may be performed at step 120 of FIG. 2 dependent on how the beat ID enable and beat ID valid signals are used. At step 150, it is determined if the beat ID enable signal issued by the master device with the original access request is set. If not, then the slave device will, at step 155, locally buffer the read data for each beat, and then output data transfers so that the data items are returned to the master device 10 via the connection medium 30 in beat order. The beat ID valid signal will then be cleared for each data transfer if the implementation employs a beat ID valid flag. As with the earlier discussion of step 125, the RLAST signal will be appended to the final data transfer output for the transaction.

If at step 150 it is determined that the beat ID enable signal is set, then at step 160 it is determined whether the slave device is nonetheless not using beat IDs for the current transaction. There may be a number of reasons why the slave device may not use beat IDs, one example being where the slave device is a legacy device that does not support the generation of beat IDs. In that event the beat ID valid signal can be tied to a logic 0 value. If the slave device is not using beat IDs for the current transaction, then the process will again proceed to step 155. However, otherwise the process will proceed to step 165 of FIG. 3, where step 125 of FIG. 2 is performed, and the process then continues as discussed earlier with reference to FIG. 2.

Figure 4:
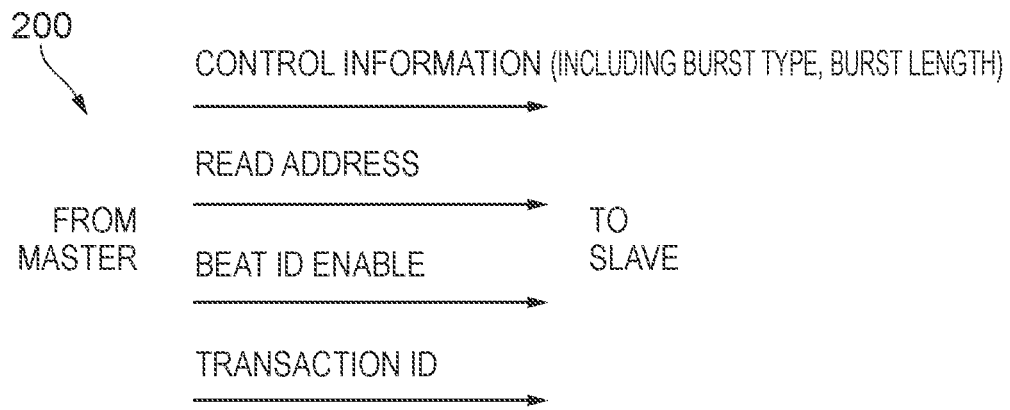
FIG. 4 illustrates the various address transfer signals and data transfer signals employed within the system of FIG. 1 in one example.
Figure 4:
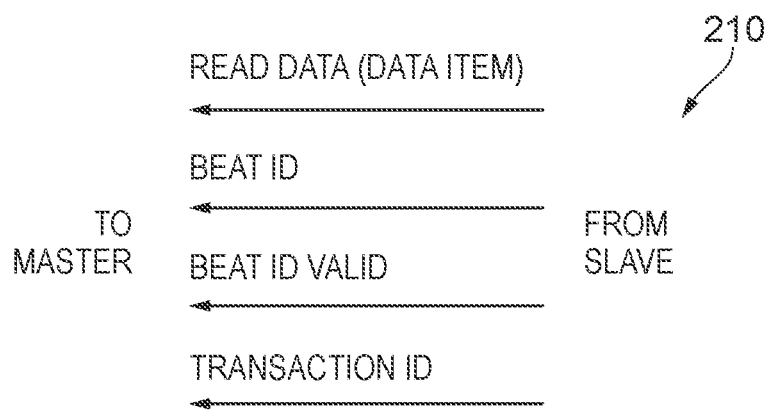

FIG. 4 illustrates the signals that may be provided within address transfers issued by the master device and data transfers issued by the slave device. In particular, the collection of signals 200 indicates information that is output as part of an address transfer from the master device to the slave device for a burst read transaction. In addition to the earlier discussed read address, control information is output to identify the type of transaction. This will for example identify if the transaction is a read transaction or a write transaction, and whether the transaction is a burst transaction. For a burst read transaction, the control information will identify information about the burst, such as the burst type, and the burst length, the burst length identifying the number of beats required for the burst transaction.

The earlier discussed beat ID enable signal can also be issued, and in addition a transaction ID will typically be issued to enable the particular transaction to be identified when corresponding data transfers are returned to the master device. In particular, the master device may support the use of more than one pending transaction at any particular point in time, and hence needs to be able to identify, for a received data transfer, which transaction that data transfer relates to.

As shown by the collection of signals 210, the data transfer signals will include the read data (i.e. the data item for the current beat associated with that data transfer), and will also include a beat ID signal to identify the beat ID generated by the beat ID generator 50. The beat ID valid signal is then used to identify whether the beat ID information is valid or not, and if the beat ID valid signal is cleared, the master device will then ignore the beat ID information and will instead assume that the individual data transfers are being returned in beat order. The transaction ID can also be returned as part of the data transfer signals, to enable the master device to identify to which transaction any particular received data transfer relates.

Figure 5:
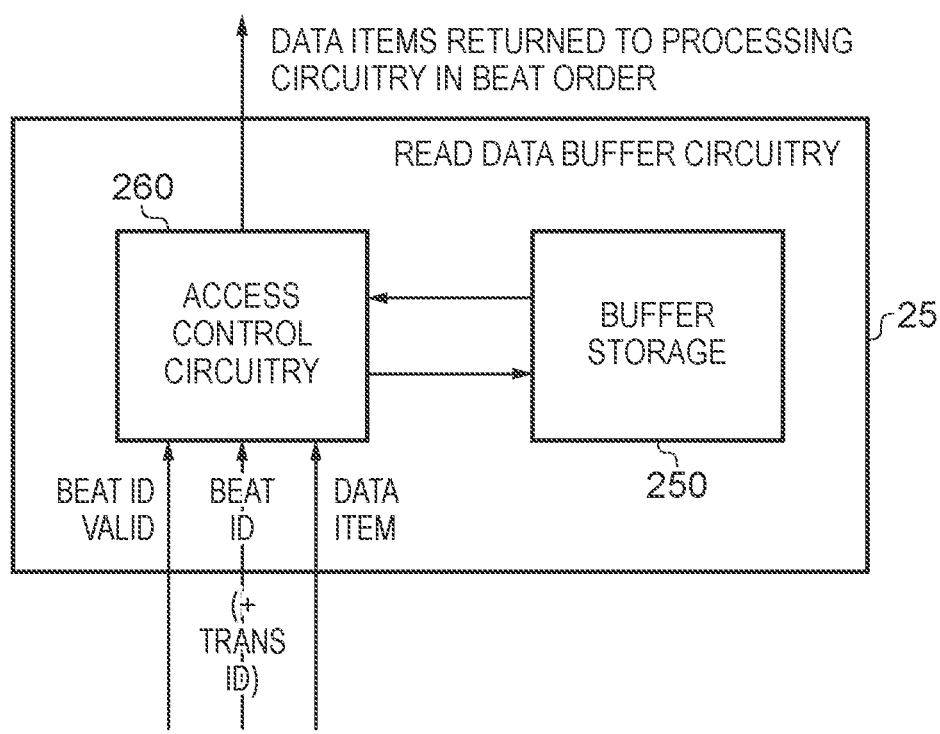
FIG. 5 is a diagram illustrating in more detail the read data buffer circuitry of the master device of FIG. 1 in accordance with one example arrangement.

FIG. 5 is a diagram illustrating in more detail the read data buffer circuitry 25 of FIG. 1. The read data buffer circuitry has buffer storage 250 having a plurality of entries, where each entry can be used to store a read data item returned via a data transfer from the slave device. In addition, access control circuitry 260 is used to control access to the buffer storage. In particular, the access control circuitry 260 can control the individual entry within the buffer storage that is used to buffer each item of read data received from the connection medium 30, and also can control the reading out of content from the entries of the buffer storage in order to produce a stream of data items for returning to the processing circuitry 15 in beat order. As shown in FIG. 5, the access control circuitry 260 will receive the various signals forming a data transfer, and in situations where the beat ID is valid, uses a combination of the beat ID and the transaction ID to identify the individual entry into which the received data item should be stored within the buffer storage 250. This enables the individual beats of a burst read transaction to be temporarily buffered within the buffer storage in a particular order, so that when those data beats are subsequently accessed, they can be returned to the processing circuitry in beat order.

The operations performed by the access control circuitry 260 in one particular example arrangement will be discussed further with reference to the flow diagram of FIG. 6.

At step 300, the access control circuitry 260 determines if a new data transfer has been received. When a data transfer has been received, then at step 305 it is determined whether the beat ID valid signal is set to indicate that the beat ID is valid. If not, then the beat ID information is ignored, and at step 310 the data item is returned to the processing circuitry. In particular, when the beat ID valid signal is clear, it is assumed that the slave device has managed the ordering of the data transfers, so as to ensure that each beat is returned in beat order to the master device. If desired, at step 310, there may be some localised buffering of the returned data, for example to accommodate situations where the processing circuitry is not yet ready to receive the data items (the buffers hence facilitating absorbing of link back pressure), but in that event the buffering will effectively implement a first in first out (FIFO) mechanism so that the data items will be forwarded to the processing circuitry in the order in which the data transfers are received by the master device.

If at step 305 it is determined that the beat ID is valid, then at step 315 the transaction ID and beat ID are used to identify an entry in the buffer, and then the received data item is stored in that identified entry.

At step 320, it is then determined whether the last data transfer of the burst read transaction has been received. With reference to the earlier discussed examples, this can be indicated by the presence of the RLAST signal that is provided by the slave device in association with the last data transfer. If it is not the last data transfer, then the process returns to step 300 to await receipt of the next data transfer.

However once the last data transfer has been received, then the process proceeds to step 325 where the access control circuitry 260 is used to access a sequence of entries within the buffer storage in a predetermined order in order to read the data items stored therein and provide those data items to the processing circuitry. Due to the way in which the transaction ID and beat ID were used at step 315 to determine the entry into which each received data item is stored, then irrespective of the order in which the individual beats were received, the same sequence of entries can be accessed in the same predetermined order at step 325, and will result in the data items being returned to the processing circuitry in beat order.

Figure 6:
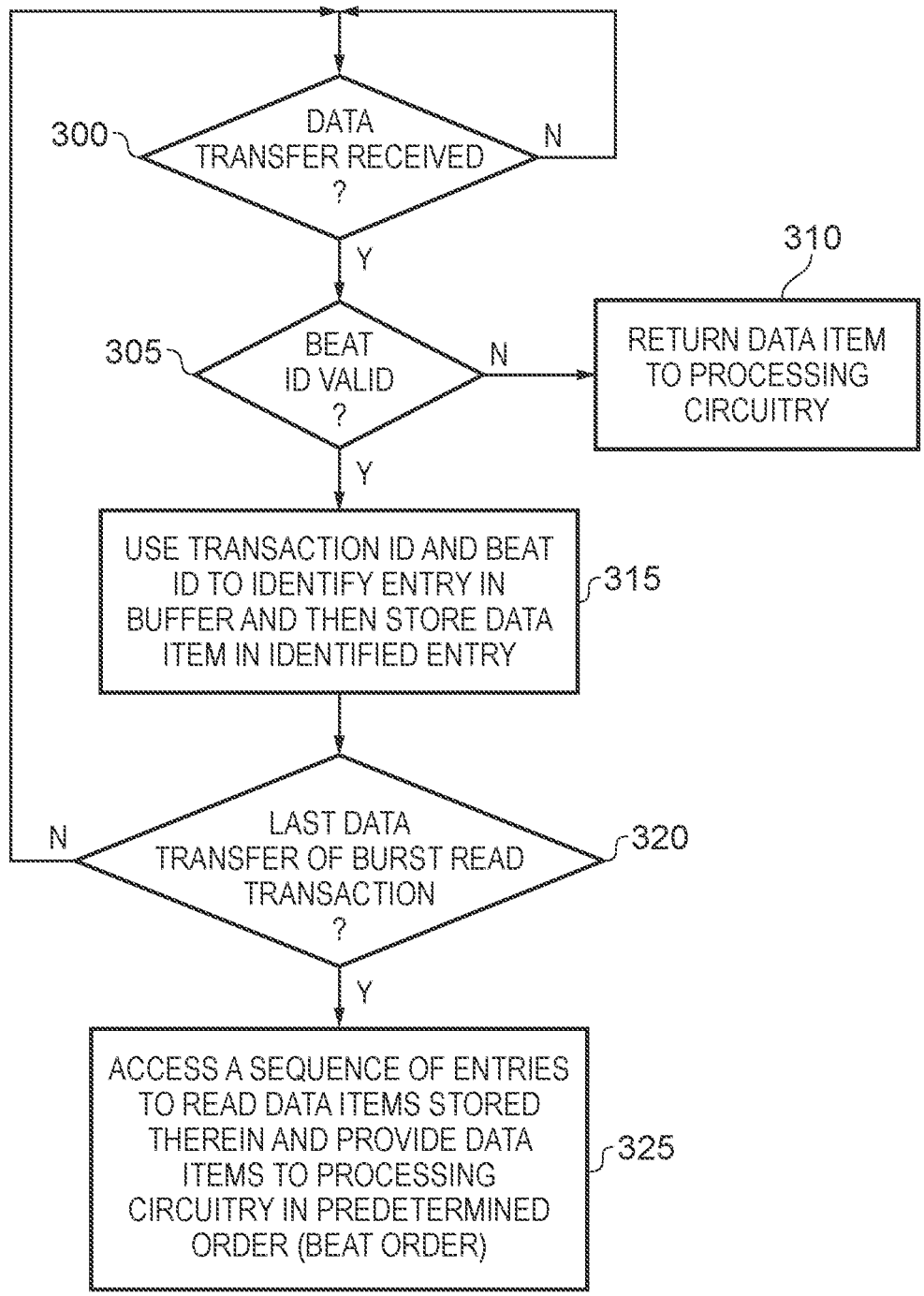
FIG. 6 is a flow diagram illustrating the operation of the access control circuitry of FIG. 5 in accordance with one example arrangement.

Whilst in the example of FIG. 6, all of the beats of a particular burst read transaction are buffered within the read data buffer circuitry, and only once the RLAST signal has been received are the data items of each beat then read out from the data buffer circuitry and provided to the processing circuitry, in an alternative implementation it may be possible to begin forwarding the individual beats of data to the processing circuitry in beat order before all of the beats have been received. In particular, if the access control circuitry is provided with a mechanism for monitoring the state of each of the entries that are to be associated with beats of a particular burst read transaction, it may be able to detect situations where some of the data items are ready to be provided in beat order to the processing circuitry, even when not all of the beats have been received. For example, if a burst transaction identifies eight beats, labelled beats 1 to 8, and those beats need to be returned to the processing circuitry in beat order, then if at a particular point in time it is noted that the buffer storage stores beats 1, 2, 3, 7 and 8, the data items for beats 1, 2, and 3 may be forwarded to the processing circuitry before all of the remaining beats have been received. However, it will be noted that beats 7 and 8 will be not be forwarded to the processing circuitry until beats 4, 5, and 6 have been received.

Figure 7:
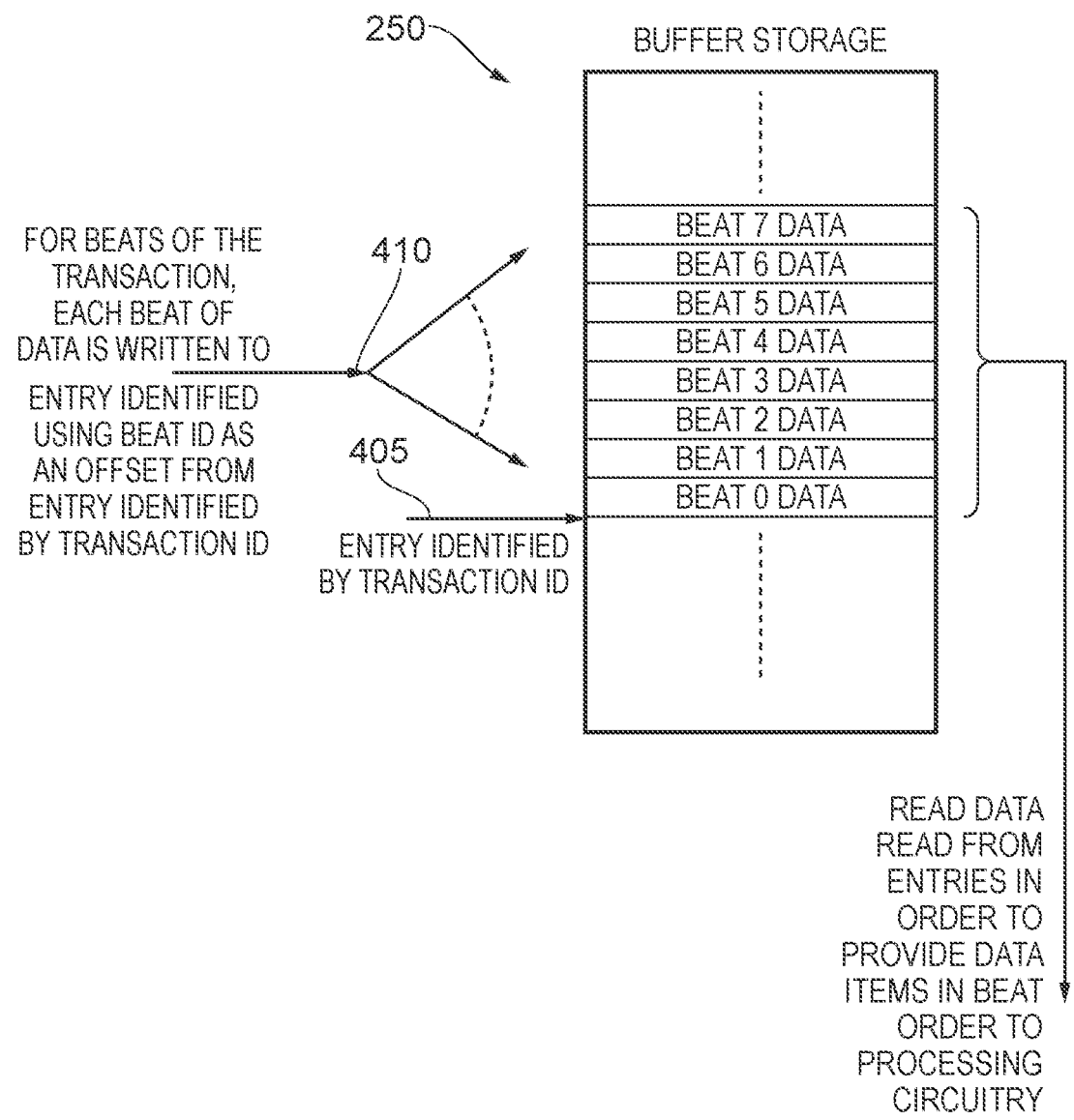
FIG. 7 schematically illustrates how the buffer storage of FIG. 5 is used to collate the various data beats of a burst read transaction in one example arrangement.

FIG. 7 schematically illustrates how the beat ID and transaction ID information may be used to identify a particular entry within the buffer storage 250. In this example, the transaction ID 405 is used to identify an initial entry amongst a sequence of entries that are to be used to store the individual beats of read data for the burst read transaction. The beat ID 410 is then used to identify an offset relative to the entry identified using the transaction ID. In one particular embodiment, the transaction ID can be directly used as a pointer, and the beat ID may have a value that directly encodes the offset. For instance, in the example of FIG. 7 the beat ID may take values from 0 to 7 to identify which of the eight beats of an 8-beat burst read transaction the corresponding data transfer relates to, and that beat ID can be added to the pointer value determined from the transaction ID 405, in order to identify the particular entry in the buffer storage 250 that is to be used to buffer the read data of that beat.

As discussed earlier, the read data can then be read from the entries in sequential order starting with the entry storing the data for beat 0 and ending with the entry storing the data for beat 7, in order to provide the beats of data in beat order to the processing circuitry.

Figure 8:
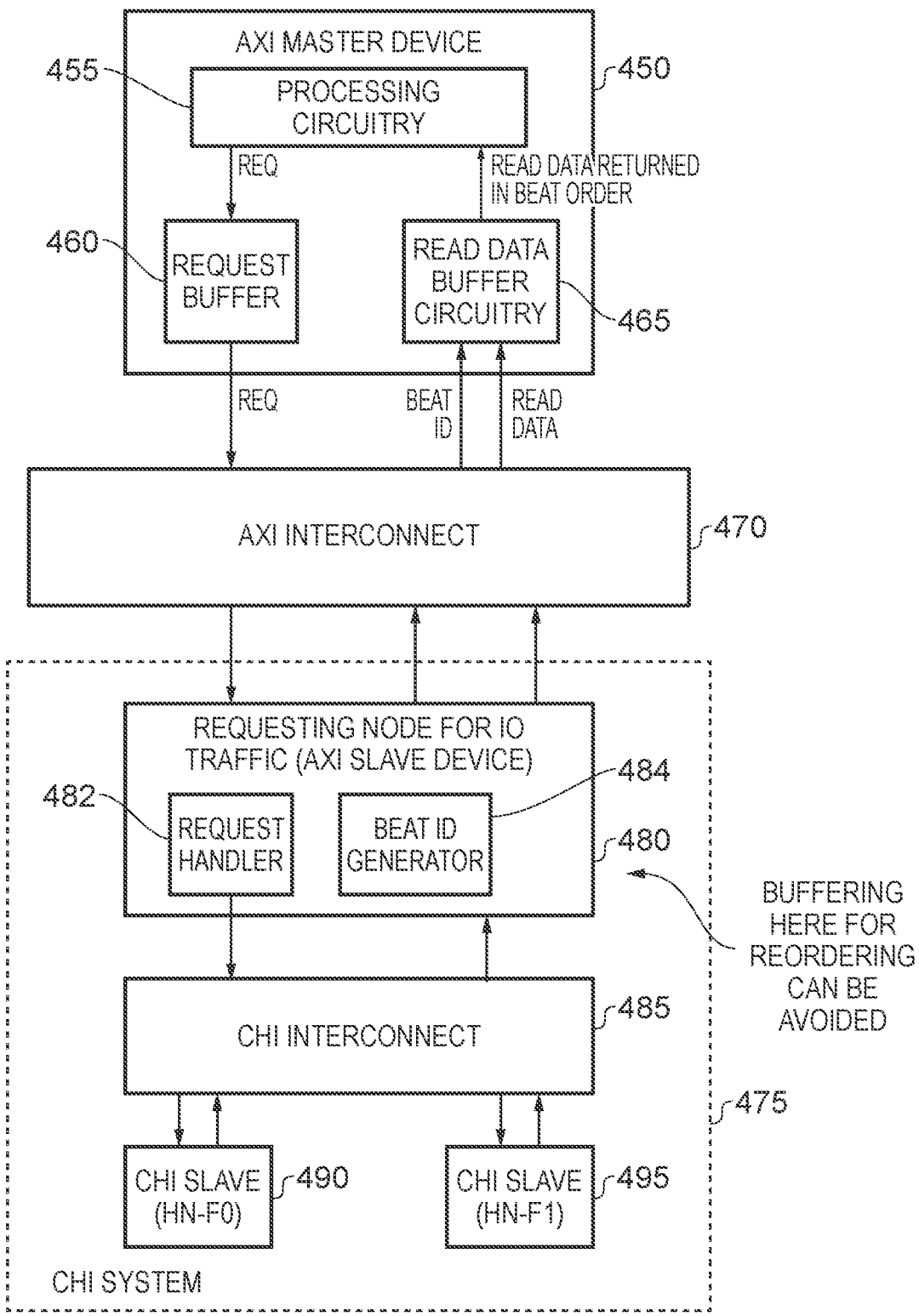
FIG. 8 is a block diagram of a system in accordance with a particular example implementation.

FIG. 8 is a block diagram illustrating a particular example implementation where the master device and slave device are AXI master and slave devices interconnected by an AXI interconnect 470, with communications within the system being performed between the master and slave devices 450, 480 in accordance with the AXI protocol developed by Arm Limited, Cambridge, United Kingdom. The processing circuitry 455, request buffer 460 and read data buffer circuitry 465 of the AXI master device 450 operate in the manner discussed earlier with respect to the processing circuitry 15, request buffer 20 and read data buffer circuitry 25 of the master device 10 of FIG. 1.

Via the AXI interconnect 470, the AXI master device 450 is connected to a subsystem 475 in which communications between the various components are performed in accordance with a different protocol. In particular, in the example shown in FIG. 8 the subsystem 475 is a coherent hub interface (CHI) system where a requesting node for IO traffic 480 is connected via a CHI interconnect 485 to a number of CHI slave devices 490, 495. The requesting node for IO traffic 480 (also referred to herein as the RN-I) operates as the AXI slave device, and has a request handler 482 and beat ID generator 484 operating in an analogous manner to the request handler 45 and beat ID generator 50 of the slave device 40 discussed with reference to FIG. 1. The RN-I 480 also acts as a master device within the CHI system, for issuing requests via the CHI interconnect 485 to the various slave devices 490, 495, which are also referred to herein as home nodes HN-F0 and HN-F1.

The request handler 482 can receive the address transfer for the burst read transaction from the AXI master device 450 via the AXI interconnect 470, and based thereon can issue a series of read requests via the CHI interconnect 485 to the relevant CHI slave device 490, 495. In particular, the RN-I 480 is arranged to break the transaction into different parts at the cache line boundary since the CHI protocol does not allow burst transactions. All the correspondingly produced cache line sized CHI transactions are initiated from the RN-I, and may go to different home nodes which will return the read data in any order to RN-I.

Figure 9:
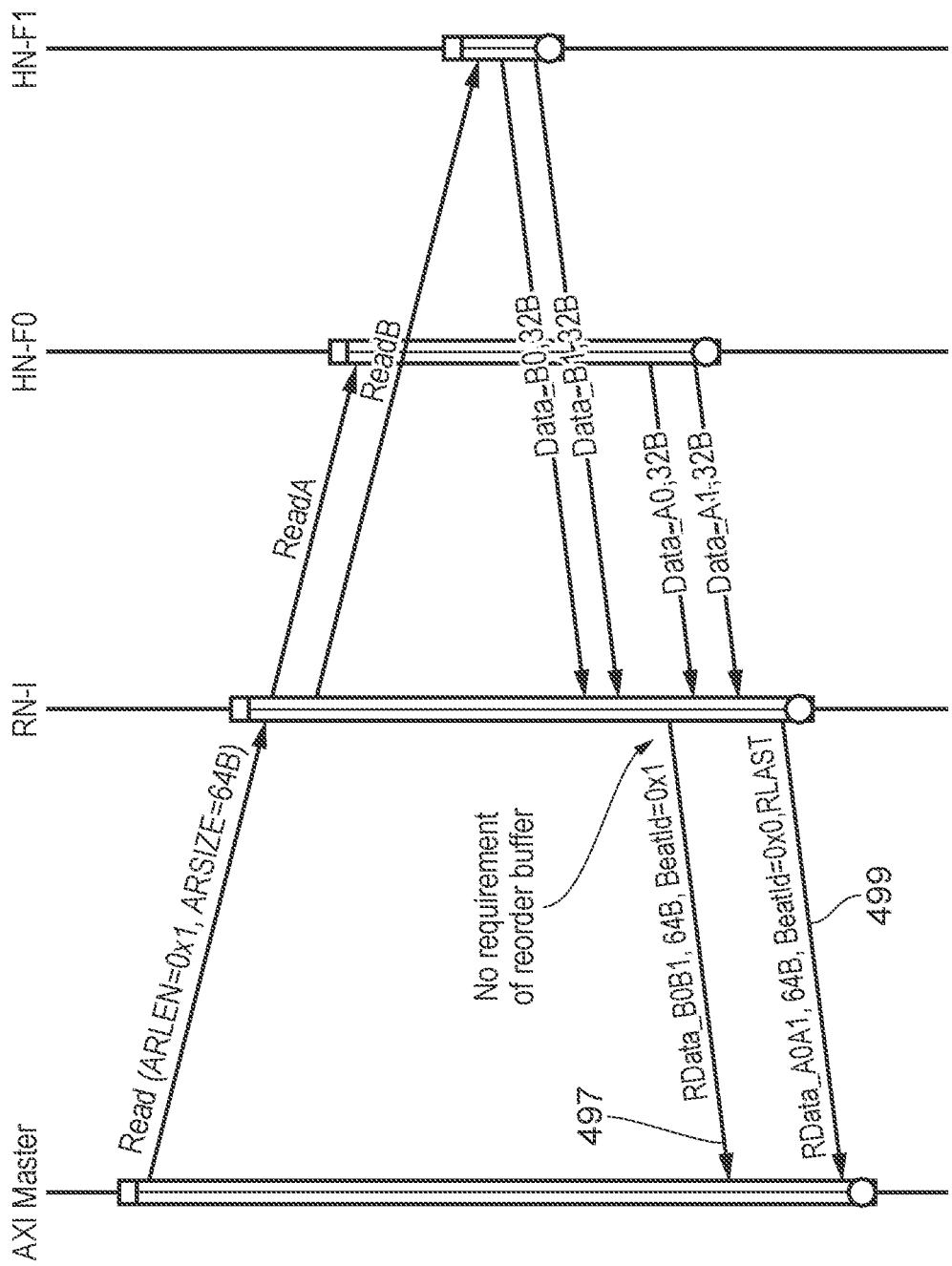
FIG. 9 is a diagram illustrating how signals are routed between components of the system of FIG. 8, in accordance with one example implementation.

A particular example sequence is illustrated purely by way of example in FIG. 9. In this example, the AXI master 450 issues a burst read transaction identifying that the data element size is 64 bytes and that the burst length is 2. The RN-I 480 then receives the address transfer, and generates two separate read requests (referred to in FIG. 9 as ReadA and ReadB), but based on the address derived for each read request, one request goes to the first slave device 490 while the other request goes to the second slave device 495.

It is possible in such an instance that the data may be received back from the slave devices in a different order, as indeed is the case illustrated in FIG. 9. Further, in the example given, each data transfer from a CHI slave will be 32 bytes in length and accordingly two transfers will be required in order to provide the 64 bytes of data required for each beat.

Without the beat ID technique discussed earlier, it would be necessary in the example shown in FIG. 9 for the RN-I 480 to include reorder buffer circuitry in order to enable the various data items to be reordered, so that the first AXI data transfer back to the master device contained the first beat whilst the second data transfer contained the second beat. However, in accordance with the techniques described herein that is not required, and instead, once the required 64 bytes of data are available for a particular beat, they can be returned over the AXI interconnect with a beat ID used to identify which beat the data item relates to. Hence, as shown in FIG. 9, a first data transfer 497 contains the 64 bytes of data formed by the data values B0 and B1 returned from HN-F1 495, and the beat ID is set to identify that the data item is the second beat of the read burst transaction. Then, once the data required for the first beat is available, a second data transfer 499 is issued back to the AXI master specifying as a beat ID that the first beat of data is being provided by that data transfer. Since both beats have now been provided, the RLAST signal is appended to this second data transfer 499, so that the AXI master device knows that both data items have now been transmitted.

It will be appreciated that the techniques described herein provide a number of advantages. Firstly, from an area savings perspective, the techniques described remove the need for response reordering for bigger burst read transactions, hence avoiding the need for reorder buffers at all the intermediate points on the interconnect. Thus the system can become optimised from an area/power perspective. Secondly, the technique provides an ability to send larger burst transactions, so that the benefits associated with larger burst transactions can be obtained, such as better system MMU lookup efficiency and reduced PCIe header overhead. In addition, the techniques can provide a performance improvement in area-optimised interconnects (i.e. those without reorder buffers), since there is no need to serialise read transactions in such area-optimised systems, which can result in such area-optimised systems running at higher performance points.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
   a master device; and
   a slave device coupled to the master device via a connection medium;
   the master device comprising processing circuitry to initiate a burst read transaction causing the master device to issue to the slave device, via the connection medium, an address transfer specifying a read address;
   the slave device being arranged to process the burst read transaction by causing a plurality of data items required by the burst read transaction to be obtained using the read address specified by the address transfer, and by performing a plurality of data transfers over the connection medium in order to transfer the plurality of data items to the master device;
   the slave device comprising transfer identifier generation circuitry to generate, for each data transfer, a transfer identifier to be transmitted over the connection medium to identify which data item in said plurality of data items is being transferred by that data transfer; and
   the master device comprising data buffer circuitry to buffer data items received via the plurality of data transfers, and to employ the transfer identifier provided for each data transfer to cause the plurality of data items to be provided to the processing circuitry in a determined order irrespective of an order in which the data items are transferred to the master device via the plurality of data transfers.

2. An apparatus as claimed in claim 1, wherein the data buffer circuitry comprises a buffer storage having a plurality of entries to store data items, and access control circuitry arranged, for each data transfer, to employ the transfer identifier provided for that data transfer to determine into which entry the associated data item is stored.

3. An apparatus as claimed in claim 2, wherein each transaction initiated by the processing circuitry has a transaction identifier which is provided in association with each transfer performed over the connection medium, and for each data transfer the access control circuitry is arranged to use the transaction identifier and the transfer identifier provided for that data transfer to determine into which entry the associated data item is stored.

4. An apparatus as claimed in claim 2, wherein the access control circuitry is arranged to determine the entries into which the plurality of data items of the read burst transaction are stored, such that when those entries are accessed in a predetermined sequence during a read operation, that read operation causes the plurality of data items to be provided to the processing circuitry in the determined order.

5. An apparatus as claimed in claim 1, wherein the slave device is arranged to provide, in association with a final data transfer issued over the connection medium for the burst read transaction, a last transfer identifier.

6. An apparatus as claimed in claim 5, wherein the data buffer circuitry is responsive to the last transfer identifier to allow a read operation to be performed once the data item of the final data transfer has been buffered, the read operation causing the plurality of entries storing the plurality of data items to be read in order to provide the plurality of data items to the processing circuitry in the determined order.

7. An apparatus as claimed in claim 1, wherein the burst read transaction has a burst length indication comprising n bits and used to encode the number of data items required by the burst read transaction, and the transfer identifier is formed by an n-bit signal.

8. An apparatus as claimed in claim 1, wherein the master device is arranged to issue, in association with the address transfer for the burst read transaction, a transfer identifier enable signal which is set to identify that the master device supports the use of transfer identifiers.

9. An apparatus as claimed in claim 8, wherein when the transfer identifier enable signal is clear, the slave device is arranged to disable the transfer identifier generation circuitry and to arrange the plurality of data transfers such that the plurality of data items are returned over the connection medium to the master device in the determined order.

10. An apparatus as claimed in claim 1, wherein the slave device is arranged to issue, in association with the data transfers for the burst read transaction, a transfer identifier valid signal which is set to identify that a transfer identifier signal associated with each data transfer provides a valid transfer identifier.

11. An apparatus as claimed in claim 10, wherein when the transfer identifier valid signal is clear, the master device is arranged to ignore the transfer identifier signal associated with each data transfer and instead to assume that the plurality of data items received via the plurality of data transfers are in the determined order.

12. An apparatus as claimed in claim 1, wherein the burst read transaction has a default ordering associated therewith indicating an order in which the data items are expected by the processing circuitry, and the determined order ensures that the data items are provided to the processing circuitry so as to conform to the default ordering.

13. An apparatus as claimed in claim 12, wherein each data item has an associated address that is derived with reference to burst type information and the read address specified by the data transfer, and the default ordering corresponds to an order in which the addresses are derived for the plurality of data items.

14. An apparatus as claimed in claim 2, wherein the processing circuitry is arranged to have up to M burst read transactions active at any point in time, and the number of entries in the buffer storage is sufficient to allow the plurality of data items of each of those M burst read transactions to be buffered.

15. An apparatus as claimed in claim 1, further comprising:
   interconnect circuitry to provide the connection medium, and arranged to interconnect one or more master components with one or more slave components, the master device forming one of the master components and the slave device forming one of the slave components.

16. A master device comprising:
   interface circuitry to connect the master device to a connection medium to facilitate communication with a slave device;

processing circuitry to initiate a burst read transaction causing the master device to issue to the slave device, via the connection medium, an address transfer specifying a read address;

the interface circuitry being arranged to receive from the slave device a plurality of data transfers via the connection medium, each data transfer providing a data item amongst a plurality of data items required by the burst read transaction, for each data transfer a transfer identifier being provided by the slave device over the connection medium to identify which data item in said plurality of data items is being transferred by that data transfer; and data buffer circuitry to buffer data items received via the plurality of data transfers, and to employ the transfer identifier provided for each data transfer to cause the plurality of data items to be provided to the processing circuitry in a determined order irrespective of an order in which the data items are transferred to the master device via the plurality of data transfers.

17. A slave device comprising:

interface circuitry to connect the slave device to a connection medium to facilitate communication with a master device, the interface circuitry being arranged to receive, via the connection medium, an address transfer specifying a read address in response to a burst read transaction being initiated by processing circuitry of the master device, the slave device being arranged to process the burst read transaction by causing a plurality of data items required by the burst read transaction to be obtained using the read address specified by the address transfer, and by issuing a plurality of data transfers over the connection medium in order to transfer the plurality of data items to the master device; and transfer identifier generation circuitry to generate, for each data transfer, a transfer identifier to be transmitted over the connection medium to identify which data item in said plurality of data items is being transferred by that data transfer, thereby enabling the master device to buffer data items received via the plurality of data transfers, and to employ the transfer identifier provided for each data transfer to cause the plurality of data items to be provided to the processing circuitry in a determined order irrespective of an order in which the data items are transferred to the master device via the plurality of data transfers.

18. A method of processing burst read transactions, comprising:

employing processing circuitry of a master device to initiate a burst read transaction to cause the master device to issue to a slave device, via a connection medium, an address transfer specifying a read address;

processing the burst read transaction at the slave device by causing a plurality of data items required by the burst read transaction to be obtained using the read address specified by the address transfer, and by performing a plurality of data transfers over the connection medium in order to transfer the plurality of data items to the master device;

generating at the slave device, for each data transfer, a transfer identifier to be transmitted over the connection medium to identify which data item in said plurality of data items is being transferred by that data transfer; and buffering at the master device data items received via the plurality of data transfers, and employing the transfer identifier provided for each data transfer to cause the plurality of data items to be provided to the processing circuitry in a determined order irrespective of an order in which the data items are transferred to the master device via the plurality of data transfers.

19. An apparatus comprising:

master means; and slave means for coupling to the master means via a connection medium;

the master means comprising processing means for initiating a burst read transaction causing the master means to issue to the slave means, via the connection medium, an address transfer specifying a read address;

the slave means for processing the burst read transaction by causing a plurality of data items required by the burst read transaction to be obtained using the read address specified by the address transfer, and by performing a plurality of data transfers over the connection medium in order to transfer the plurality of data items to the master means;

the slave means comprising transfer identifier generation means for generating, for each data transfer, a transfer identifier to be transmitted over the connection medium to identify which data item in said plurality of data items is being transferred by that data transfer; and the master means comprising data buffer means for buffering data items received via the plurality of data transfers, and for employing the transfer identifier provided for each data transfer to cause the plurality of data items to be provided to the processing means in a determined order irrespective of an order in which the data items are transferred to the master means via the plurality of data transfers.

* * * * *